Figure 1:
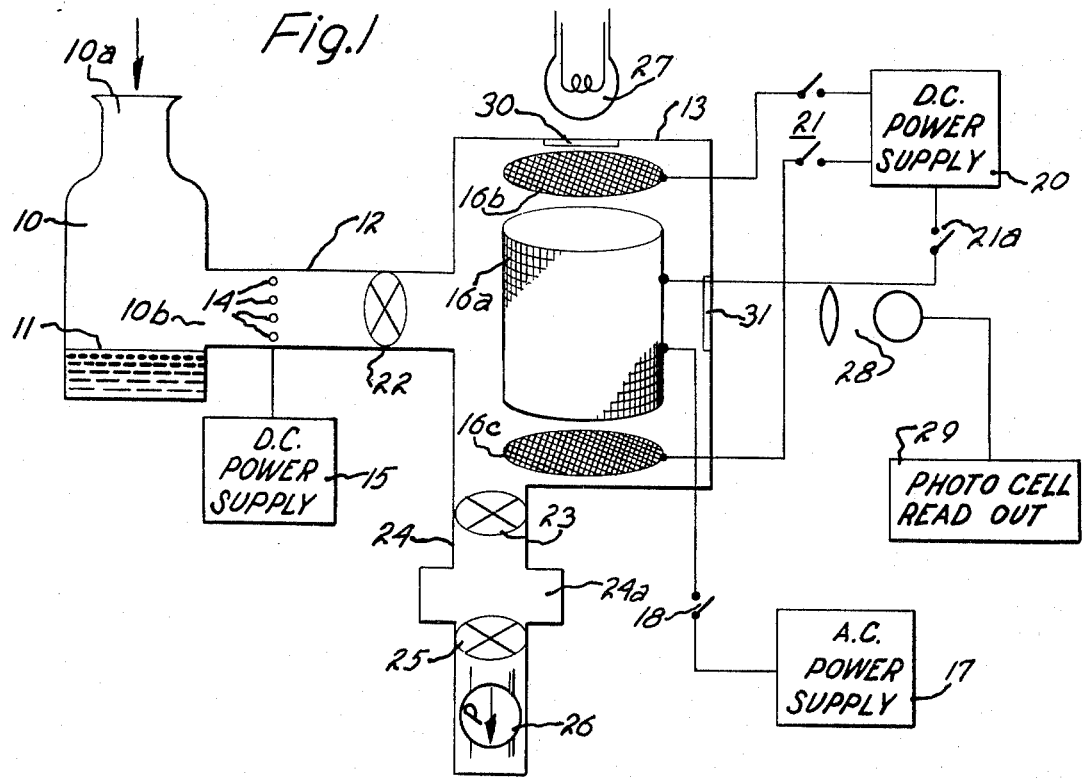

United States Patent [19]
Whetten

[11] 3,740,149
[45] June 19, 1973

[54] METHOD AND APPARATUS FOR MEASURING SIZE DISTRIBUTION OF PARTICLES USING A THREE-DIMENSIONAL ALTERNATING CURRENT ELECTRIC FIELD

[75] Inventor: Nathan Rey Whetten, Burnt Hills, N.Y.

[73] Assignee: General Electric Company, Schenectady, N.Y.

[22] Filed: Feb. 2, 1972

[21] Appl. No.: 222,768

[52] U.S. Cl............ 356/102, 250/41.9 DS, 356/103
[51] Int. Cl. ........................................... G01n 15/02
[58] Field of Search........................... 250/41.9 DS; 356/102, 103, 104

[56] References Cited
UNITED STATES PATENTS

| | | | |
|---|---|---|---|
| 3,621,240 | 11/1971 | Cohen.......................... | 250/41.9 DS |
| 3,632,210 | 1/1972 | Rich.................................... | 356/103 |

Primary Examiner—Ronald L. Wibert
Assistant Examiner—Conrad Clark
Attorney—John F. Ahern, Julius J. Zaskalicky and Louis A. Moucha

[57] ABSTRACT

The size distribution of particles including particulate matter in a gas sample is determined by generating a three-dimensional alternating current electric field in an expansion chamber for mass-selective sorting of the particles whereby condensible vapor saturated charged particles in the gas sample which are in a particular range of charge-to-mass ration are trapped within the electric field and the particles outside the range are swept away. An expansion of the gas in the expansion chamber causes condensation of droplets on the trapped particles and a condensation nuclei counter may be used for detecting the number of droplets which corresponds to a like number of the trapped particles in the particular range of charge-to-mass ratio occurring in the gas sample.

27 Claims, 2 Drawing Figures

METHOD AND APPARATUS FOR MEASURING SIZE DISTRIBUTION OF PARTICLES USING A THREE-DIMENSIONAL ALTERNATING CURRENT ELECTRIC FIELD

My invention relates to a method and apparatus for measuring the size distribution of particles including particulate matter in a gas sample, and in particular, to a method and apparatus employing a three-dimensional quadrupole mass filter for selecting charged particles in particular ranges of charge-to-mass ratio, and a condensation nuclei detector.

There are many applications for an apparatus capable of monitoring the size and quantity of particles including particulates in various types of gaseous environment including the atmosphere. As examples, broad area monitoring is utilized for determining the degree of contamination in the atmosphere, and small area monitoring for decermining contamination in areas such as factory rooms in which are being manufactured dust-sensitive electronic components and the like. Such apparatus is also useful in determining the efficiency of various type particle filters such as those employed in air conditioners.

The conventional condensation nuclei detector can measure the total number of particulates but cannot readily determine their size distribution. A common method for determining particle size is electrosatic precipitation followed by electron microscope analysis, but this is a tedious, nonautomatic technique, and thus is not available for continuous, automatic monitoring of a particular environment or gas sample. Recently, there has been developed a particle size analyzer using mobility separation of the particles in a D.C. electric field, but large currents of air and a discharge ionizing technique are necessary for obtaining a readable current on the electrometer detector employed. Disadvantages of the mobility separator are (1) the gas flow rate through the mobility detector is critical and the detector counter accepts the gas in pulses, (2) particle separation depends on the proximity of the particles to an electrode, and (3) the mobility detector passes all particles except those with a mobility high enough to be separated out at a given voltage thereby requiring the taking of differences between successive readings in order to obtain the number of particles in a given size range. This inability to conveniently determine both the size and distribution of particulates is especially true for particulates of sizes less than 0.1 micron in diameter. These are the sizes that cannot be filtered out by conventional techniques and thus can become a contamination problem in various manufacturing processes as well as causing biological damage. Extensive knowledge of the size distribution is important since it may permit identification of the type and source of the contaminant particles.

Therefore, one of the principal objects of my invention is to provide an improved method and apparatus for measuring the size distribution of particles in a gaseous environment.

Another object of my invention is to provide the method and apparatus for measuring size distribution of particles including particulates especially having sizes less than 0.1 micron diameter.

A further object of my invention is to provide the method and apparatus for measuring particle size distribution which is relatively simple and the apparatus is not sensitive to the rate of flow of the gas therethrough.

In accordance with my invention, I provide an apparatus and method for measuring the size distribution of particles including particulate matter in a gas sample utilizing a three-dimensional multipolar electrodynamic field and condensation nuclei detection techniques. At the input end of the apparatus I provide a means for saturating the gas sample with a condensible vapor and pass the condensible vapor saturated gas sample through a duct to an expansion chamber wherein is located a means for generating a three-dimensional alternating current electric field for mass-selective sorting of the particles in the gas sample whereby charged particles in a particular range of charge-to-mass ratio are trapped within the field and charged particles outside such range are directed to the sides of the chamber. An expansion of the vapor saturated gas sample in the expansion chamber produces cooling and supersaturation thereof whereby droplets condense on the trapped particles and are detected by a condensation nuclei counter to thereby determine the relative number of the trapped particles in the particular range of charge-to-mass ratio. Variation of the voltage or frequency applied to the three-dimensional alternating current electric field generating means permits measurement of trapped particles in different ranges of charge-to-mass ratio to thereby obtain the size distribution thereof.

Figure 2:
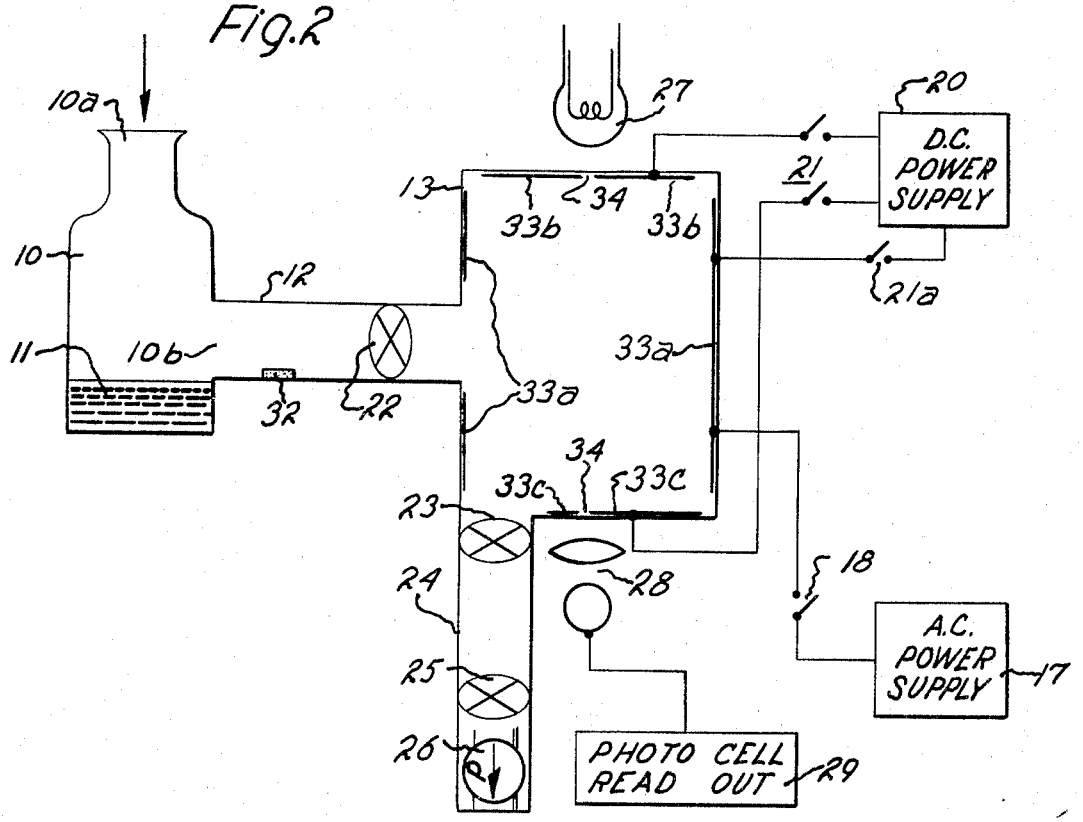

The features of my invention which I desire to protect herein are pointed out with particularity in the appended claims. The invention itself, however, both as to its organization and method of operation, together with further objects and advantages thereof may best be understood by reference to the following description taken in connection with the accompanying drawing wherein like parts in each of the several figures are identified by the same reference character and wherein:

FIG. 1 is a diagrammatic representation of a first embodiment of the particle size distribution measurement apparatus in accordance with my invention; and FIG. 2 is a diagrammatic representation of a second embodiment of my invention.

Referring now to FIG. 1, there is shown a first embodiment of an apparatus for measuring the size distribution of particles including particulate matter in accordance with my invention. In particular, a suitable vessel 10 is provided for saturating a gas sample with a readily condensible vapor. The gas sample containing various particles which are to be analyzed in accordance with their size distribution is supplied to vessel 10 through an input end 10a thereof. Particles are defined herein as including both molecules and the larger size particulate matter. The gas sample to be analyzed is drawn into vessel 10 due to the generation of a partial vacuum in the apparatus by a pump at the output end of the apparatus to be described hereinafter. The input end 10a of vessel 10 is open to the atmosphere when analyzing the particles therein, and would be connected to the output of a filter device such as an air conditioner when testing the efficiency thereof. Vessel 10 may assume any of a number of forms and its size is determined primarily by the size of the gas sample to be analyzed. Vessel 10 is partially filled with a relatively high vapor pressure liquid such as water or alcohol, and the output end 10b of the vessel is oriented relative to the top surface of the liquid and the input end 10a of the vessel such that the gas sample passes along the top surface of the liquid 11 in close proximity thereto for achieving a high degree of saturation with the readily condensible vapor. As one example, vessel 10 may be a flask provided with a hole through its side located just slightly above the top surface of the liquid 11.

A duct 12 having an input end connected to the output 10b of vessel 10 provides a means for passage of the gas sample to an expansion chamber 13. Although my invention is applicable for measurement of the size distribution of particles in many types of gaseous environments, it will be described with reference to an air sample as one typical example. It is known that particles in the atmosphere often carry electrical charges, but in many cases such charges may be so small as to negate their use in my apparatus. For this purpose, and with the understanding that it may not be necessary in all applications, especially when it is known that the particles involved are in fact sufficiently charged, a means for electrically charging the particles is provided near the input end of duct 12. As one example, the particle electrical charging means may consist of a planar array of spaced parallel base electrical conductors 14 extending across substantially the total cross-sectional area within duct 12 and oriented preferably normal to the axis of the air flow. Conductors 14 are preferably of equal size in the range of 0.002 to 0.050 inch diameter and are preferably equally spaced apart in a range of 0.25 to 2.0 inch. Conductors 14 may pass separately through the wall of duct 12 and the ends of alternate conductors are connected to a D.C. high voltage source 15 which has a voltage output in the order of 10 to 20 kilovolts, and the other conductors are grounded, or, grounded plates are positioned between adjacent conductors all of which are connected to source 15. The D.C. voltage applied to conductors 14 is sufficiently high to cause a corona discharge around each of the conductors which thereby electrically charges the particles in the gas sample (air) flowing thereby. Alternatively, the conductors 14 connected to the D.C. source have their ends connected to a common bus within duct 12 adjacent a wall thereof, and the bus passes through the wall for its connection to the D.C. source. In this latter arrangement of conductors 14, the ends of the conductors may be retained in an electrically insulated frame member positioned along the inner surfaces of duct 12. Conductors 14 may be oriented horizontally, or vertically, or at other angles, as desired. Duct 12 may be fabricated of an electrically nonconductive material such as plastic, or alternatively, of a conductive material such as aluminum or other metal. In the latter case, electrical conductors 14 are suitably electrically insulated from the walls of duct 12. Duct 12 is preferably straight and may be of various shapes, a circular or square cross section being a typical and simple form.

Downstream of electrical charge producing means 14 and located at the output end of duct 12 is the expansion chamber 13. Within chamber 13 are contained electrodes for providing mass-selective sorting of the charged particles by means of mass-selective electrodynamic containment of the particles. The electrodes 16a–c are three in number for purposes of generating a three-dimensional alternating current quadrupole field and may be centrally located in the chamber as illustrated in FIG. 1. These electrodes are fabricated of an electrically conductive material in wire screen or mesh form and are analogous to those used for selective containment of ions as disclosed in U.S. Pat. No. 3,527,939, inventors Peter H. Dawson et al. and assigned to the assignee of the present invention. Central electrode 16a is in the form of a hollow cylinder and the end electrodes 16b and 16c are flat plates electrically insulated from cylindrical electrode 16a. Other shapes of the central electrode 16a and end electrodes 16b, 16c may be utilized since the shapes are not critical on the selectivity of each range of charge-to-mass ratio of particles being analyzed. End electrodes 16b and 16c are oriented perpendicular to the longitudinal axis of cylindrical center electrode 16a and these three electrodes are suitably rigidly supported from the inner surfaces of chamber 13. The electrodes when constructed of a wire screen or mesh can be fabricated of stainless steel, copper or aluminum, as several examples. In a preferred orientation, end plates 16b and 16c are parallel both to each other and to the top and bottom walls of chamber 13. Cylindrical electrode 16a is connected to an A.C. power supply 17 through switch 18. The three-dimensional alternating current electric field generated upon application of the A.C. voltage to electrode 16a provides electrodynamic containment of charged particles within a particular predetermined relatively narrow range of charge-to-mass ratio as determined by the particular voltage and frequency applied, that is, the three-dimensional quadrupole electrodynamic field provides mass-selective sorting of the charged particles by trapping charged particles which are within the particular range of charge-to-mass ratio, and sweeping all other charged particles being from the containment region to the sides of chamber 13. Although only a quadrupole mass filter is described herein for the particle or ion mass-selective sorting process, other three-dimensional multipolar A.C. electrodynamic fields, i.e., higher order fields, such as hexapole and octopole may possibly also be utilized by employing suitable electrodes.

The size of the trapped charged particles for a given set of parameters including a particular value of the applied A.C. voltage and frequency may be in the diameter range of 0.05 to 0.10 microns as one example. Decreasing the voltage and/or increasing the frequency results in the selection of smaller diameter charged particles in ranges such as 0.01 to 0.05 microns, 0.005 to 0.01 microns, and so forth. The electrode screen or mesh may, as one typical example, consist of conductors of diameter of approximately 0.010 inch and a center-to-center spacing between adjacent conductors of 0.100 inch. A typical diameter range of hollow cylindrical electrode 16a is ½ to 1 inch. The length of electrode 16a and spacing between end electrodes 16b and 16c are not critical, the length typically being 1 to 2 inches and the spacing being several inches. The dimensions of electrode 16a can be made substantially greater, if desired, but would then require a higher A.C. voltage. As in the case of conductors 14, the center and end electrodes 16–c are also electrically insulated from the walls of chamber 13 in the case wherein such chamber is fabricated of an electrically conductive material. The A.C. power supply 17 is controllably variable over a range of 0.5 to 5 kilovolts in a frequency range of 60 to 10,000 Hz. End electrodes 16b and 16c are maintained at a unidirectional potential, generally slightly negative with respect to center electrodes 16a, or may be at ground potential. Any D.C. voltage which may be applied to end electrodes 16b and 16c is supplied from a suitable D.C. power supply 20 through switch 21 and is of magnitude up to approximately 1/5 of the A.C. voltage.

If it is desired to narrow a particular range of charge-to-mass ratio of particles being analyzed, a D.C. voltage of up to several hundred volts may be applied to center electrode 16a in addition to the A.C. voltage. The D.C. voltage could be supplied from D.C. power supply 20 through switch 21a. The mass-selective sorting process which is accomplished within expansion chamber 13 results in a particle density within the confines of the three electrodes 16a–c corresponding to the number of particles of the charge-to-mass ratio per unit volume of the gas sample transmitted through duct 12 plus any neutral particles which may exist in the gas sample flow and not be affected by the quadrupole field. The neutral particles may occur because the charge generated by electrified conductors 14 may not have encountered such particular particles and attached itself thereto. The neutral particle density can be determined by applying only a D.C. voltage in the range of 2 to 10 kilovolts to center electrode 16a with electrodes 16b and 16c either grounded or at a very low D.C. potential to assure that no charged particles remain within the confines of the three electrodes during the neutral particle background determination. The neutral particles, since they are also saturated with the condensible vapor 11, have their relative number determined by the condensation nuclei counter associated with the expansion chamber 13 in the same manner as that utilized for the charged particles as will be described hereinafter.

The condensible vapor saturated particles enter expansion chamber 13 through valve 22 which is located within duct 12 at the output end thereof. A second valve 23 is located in a duct 24 connected to the output of chamber 13. Duct 24 may be of elongated length as shown in FIG. 2 for providing an appreciable volume therein between valve 23 and a third valve 25, or may be of foreshortened length but include an enlarged portion 24a therein for defining such appreciable volume. A suitable pump 26 is located in the output end of duct 24 for drawing the gas sample into vessel 10 and through duct 12 into expansion chamber 13. The normal mode of operation of my apparatus follows: D.C. power supply 15 is turned on and its output set to a desired voltage for accomplishing the electrical charging of the condensible vapor saturated particles in the gas sample flow. A.C. power supply 17 is turned on and adjusted for a particular voltage amplitude and frequency corresponding to a first range of charge-to-mass ratio to be analyzed, but switch 18 is kept open. D.C. power supply 20 is turned on and adjusted for a particular low (or ground) voltage but switch 21 is kept open. Valve 22 is initially in a closed position and valves 23 and 25 are open and pump 26 is energized for evacuating chamber 13 to approximately 80 percent of the ambient pressure. Upon reaching the prescribed vacuum, valve 23 is closed first and then valve 25. Pump 26 may continue in operation since a particle size measurement can be made in a matter of a second or less. The gas sample flow into expansion chamber 13 is now initiated by opening valve 22 for a time interval until the pressure in chamber 13 reaches substantially the ambient pressure external of vessel 10. After such time interval, which is readily predetermined, valve 22 is closed and switches 18 and 21 are closed for respectively applying the A.C. and D.C. (or ground) voltages to the center and end electrodes to generate the particular three-dimensional quadrupole field which provides the mass-selective sorting by trapping the charged particles within the particular range of charge-to-mass ratio determined by the A.C. voltage and frequency and sweeping the other charged particles out of the field to the sides of chamber 13. At the termination of the mass-selective sorting step, switches 18 and 21 are opened and chamber 13 is then expanded by opening valve 23 while maintaining valve 25 closed. This expansion of chamber 13, or more precisely, expansion of the gas sample therein, produces cooling and supersaturation such that droplets condense on the condensible vapor saturated particles in the gas sample contained in chamber 13. The number of droplets which remain trapped within the three-dimensional quadrupole field for some time correspond to a like number of particles in the first range of charge-to-mass ratio in the gas sample and their relative number can be determined from a reading on a conventional condensation nuclei counter. If desired, the counter can be calibrated to read the absolute number of detected particles. The counter, chamber 13 and associated optics form a condensation nuclei detector. The condensation nuclei detection technique is thus a convenient method for measuring the number of particles although other conventional techniques may also be utilized.

A first embodiment of the condensation nuclei detector illustrated in FIG. 1 utilizes a high intensity light source 27 for directing a high intensity light into chamber 13, and a suitable photocell 28 and associated read-out 29 for detecting the scattered light reflected by the trapped droplets in chamber 13. Light source 27 may be a xenon arc lamp or other suitable intense light source and its high intensity light output is directed through a window 30 into chamber 13 for illumination of the droplets within the volume defined by the three electrodes. Photocell 28 is oriented at 90° relative to light source 27 for detecting the light scattered off the droplets through window 31. Photocell 28 may typically be a photomultiplier and preferably includes a lens for focussing the detected scattered light on the first stage of the photomultiplier. A suitable read-out 29 for the photocell 28 is connected to the output thereof for recording the photocell output current (or voltage) which corresponds to the number (or relative number) of detected droplets. Thus, the steady state output registered on read-out device 29, which is typically a counter, corresponds to the relative or absolute number of particles within the particular range of charge-to-mass ratio determined by the A.C. power supply parameters. Other read-out devices which provide a temporary record such as an oscilloscope, or provide a permanent record such as a print-out, obviously may also be used. After a recording of this first output of read-out device 29, valve 25 is opened for removing the particles within chamber 13 and for again evacuating chamber 13 to approximately 80 percent of the ambient pressure. At the same time the voltage and, or frequency of A.C. power supply 17 is adjusted for establishing the three-dimensional electrodynamic field that will trap the charged particles in a selected second range of charge-to-mass ratio.

The hereinabove described steps are thence repeated for different predetermined values of voltage and, or frequency of the A.C. power supply 17 such that the numbers of particles in various ranges of charge-to-mass ratio of interest are measured and thereby determine the size distribution of the particles in the gas sample introduced to vessel 10. As a final step, it may be desired to determine the neutral particle background which is generally present in each of the particular ranges of charge-to-mass ratio particle count measurements. This neutral background count measurement is obtained in the same manner as in the measurement of the charged particles in a particular range of charge-to-mass ratio with the exception that switch 18 is open and a switch 21a is closed for applying a high D.C. voltage to center electrode 16a such that a high D.C. potential exists between the center and end electrodes 16b, 16c. This particular D.C. voltage is in the order of several thousand volts and upon its application to center electrode 16a causes a high strength constant D.C. field which effectively sweeps out all of the charged particles in the volume defined by the central and end electrodes and permits only the neutral particles to remain therein.

Referring now to FIG. 2, there is shown a second embodiment of my apparatus for measuring the size distribution of particles using a three-dimensional alternating current multipolar electrodynamic field. This second embodiment is virtually identical to the FIG. 1 embodiment in its operation and the structure is similar with the exception of the following differences. The means for electrically charging the condensible vapor saturated particles in the gas sample flow is a radioactive source 32 which conveniently may be supported on the inner surface of duct 12. The means for generating the three-dimensional alternating current multipolar (quadrupole in this case) electric field is the use of electrically conductive material such as silver, carbon or transparent tin oxide suitably attached or painted on the inner surfaces of the walls of chamber 13. The electrically conductive material is coated or otherwise attached along the inner top and bottom surfaces as well as along the inner side surfaces of chamber 13 analogous to the top, bottom and central electrodes in the FIG. 1 embodiment. Thus, electrically conductive coatings 33b and 33c on the inner surfaces of top and bottom walls of chamber 13 correspond to end plate electrodes 16b and 16c, respectively, in the FIG. 1 embodiment whereas coating 33a on the inner surfaces of the sides of chamber 13 corresponds to central electrode 16a. sufficient spacing is provided between coating 33a and coatings 33b and 33c to provide electrical insulation therebetween. It is assumed that chamber 13 in this embodiment is fabricated of a nonelectrically conductive material such as plexiglass or other plastic in order to avoid the necessity for adding a layer of insulation between each of the conductive coatings and adjacent surface of chamber 13. In the case wherein the electrically conductive coatings are not of the transparent type, coatings 33b and 33c are formed with small voids 34 in the center portions thereof aligned with light source 27 and photocell 28. In the case wherein chamber 13 is fabricated of a nontransparent material, windows must be provided through the walls of chamber 13 and in alignment with the light source 27 and photocell 28 for providing optical communication therebetween as in FIG. 1. As in the case of the FIG. 1 embodiment, the A.C. voltage is supplied from power supply 17 through switch 18 to central electrode 33a and the two end electrodes 33b and 33c are either grounded or a low D.C. voltage is supplied thereto from power supply 20 through switch 21 for generating a similar type of three-dimensional quadrupole electrodynamic field as in the case of the FIG. 1 embodiment. The third, and final distinction between the FIGS. 2 and 1 embodiments are in the means for sensing the droplets in expansion chamber 13. In the FIG. 1 embodiment, windows 30 and 31 are disposed in quadrature relationship for obtaining detection of the droplets by scattered light reflected from the droplets. In contradistinction, windows 30 and 31 if utilized in the FIG. 2 embodiment, or the voids 34 in electrically conductive coatings 33b and 33c are in alignment and the detection of the droplets is determined by the absorption of the light emitted from intense light source 27 and passing through chamber 13. In general, the scattered light detection method is more sensitive than the absorption of light method. The light from source 27 which is not absorbed by the droplets within the range of the windows 30 and 31 or voids 34 in coatings 33b, 33c is focussed by means of a lens on the first stage of the photomultiplier or other suitable photocell 28.

From the foregoing description, it can be appreciated that my invention makes available an improved and relatively simple method and apparatus for measuring the size distribution of particles including particulate matter occurring in a gaseous medium. The present apparatus uses a three-dimensional alternating current multipolar electric field within the expansion chamber 13 of the condensation nuclei detector as opposed to the two-dimensional field utilized in the apparatus disclosed and claimed in my concurrently filed patent application Ser. No. 222,774 wherein such two-dimensional field generating means is positioned near the entrance to the condensation nuclei detector but external thereof.

One of the advantages of my method and apparatus is that is can be automated and provide continuous particle size distribution analysis of a gaseous environment. The A.C. power supply voltage and/or frequency settings can readily be programmed as well as the operation of the valves, and a permanent read-out utilized, if desired. Advantages of my apparatus over the prior art particle size analyzer using mobility separation of the particles in a D.C. field are that my apparatus is not sensitive to the gas flow rate therethrough, the particle mass-selective sorting is not dependent on the proximity of the particles to an electrode, and the particles in a given range of charge-to-mass ratio are determined by a direct reading without requiring the difference between successive readings. Having described two particular embodiments of my invention, it is obvious that other conventional means for electrically charging the particles prior to their passage to chamber 13 as well as other conventional means for detecting the droplets within the expansion chamber may also be utilized, and therefore it is to be understood that changes may be made in the particular embodiments as described which are within the full intended scope of the invention as defined by the following claims.

What I claim as new and desire to secure by Letters Patent of the United States is:

1. Apparatus for measuring the size distribution of particles including particulate matter in a gas sample comprising means for saturating a gas sample containing various particles including particulate matter with a condensible vapor, a duct having an input end in communication with an output of said vapor saturating means, means positioned in said duct intermediate the input and output ends thereof for electrically charging the particles in the gas sample, an expansion chamber having an input in communication with an output end of said duct, pump means in communication with an output of said expansion chamber for developing a flow of the gas sample from said vapor saturating means through said duct to said expansion chamber and therefrom, means positioned within said expansion chamber for generating a three-dimensional multipolar alternating current electric field which traps and confines charged particles in a particular range of charge-to-mass ratio and directs charged particles outside the particular range of charge-to-mass ratio to sides of said chamber and thereby accomplishes mass-selective sorting of the charged particles which is not sensitive to the gas flow rate through the apparatus, and is not dependent on the proximity of the particles to an electrode, means associated with said expansion chamber for causing expansion of the condensible vapor saturated gas sample therein to produce cooling and supersaturation thereof whereby droplets condense on the particles, and means in communication with a region within said expansion chamber containing the confined particles for detecting the relative number of the droplets which correspond to a like relative number of the charged particles in the particular range of charge-to-mass ratio occurring in the gas sample.

2. The apparatus set forth in claim 1 wherein said condensible vapor saturating means consists of a vessel partially filled with a relatively high vapor pressure liquid and having an input open to the gas sample being analyzed and an output connected to the input end of said duct.

3. The apparatus set forth in claim 1 wherein said three-dimensional field generating means comprises
three electrodes including a centrally oriented hollow cylindrical electrode and two substantially flat electrodes disposed along both open ends of said cylindrical center electrode in spaced apart relationship therefrom, and
an alternating current power supply having an output connected to said center electrode whereby said center electrode is supplied with alternating current voltage and the three electrodes generate a three-dimensional quadrupole alternating current electrodynamic field.

4. The apparatus set forth in claim 3 wherein said three electrodes are formed of an electrically conductive mesh and are spaced apart from sides of said expansion chamber.

5. The apparatus set forth in claim 4 wherein said flat end electrodes are oriented parallel to each other and perpendicular to the longitudinal axis of the cylindrical center electrode.

6. The apparatus set forth in claim 5 wherein the diameter of said cylindrical electrode is in the range of ½ to 1 inch.

7. The apparatus set forth in claim 6 wherein the diameter of the conductors in the mesh is approximately 0.010 inch and the center-to-center spacing between adjacent conductors is approximately 0.100 inch.

8. The apparatus set forth in claim 3 wherein the alternating current power supply is controllably variable over a range of 0.5 to 5 kilovolts and a frequency range of 60 to 10,000 hertz.

9. The apparatus set forth in claim 3 and further comprising
a direct current power supply, and
first switch means for connecting said end electrodes to said direct current power supply whereby said end electrodes are maintained at a unidirectional potential slightly negative with respect to said cylindrical center electrode or at ground potential.

10. The apparatus set forth in claim 3 and further comprising
a direct current power supply, and
first switch means for connecting said center electrode to said direct current power supply whereby said center electrode is further supplied with direct current voltage of magnitude up to several hundred volts to thereby obtain a more narrow range of the charge-to-mass ratio of particles being analyzed.

11. The apparatus set forth in claim 3 and further comprising
first switch means for connecting said alternating current power supply to said center electrode,
a high voltage direct current power supply having a voltage output in a range up to 10 kilovolts, and
second switch means for connecting said direct current power supply to said center electrode, an open state of said first switch means and closed state of said second switch means resulting in application of only a high direct current voltage to said center electrode for generating a high strength constant direct current field which effectively sweeps out all of the charged particles in the volume defined by the center and end electrodes and permits only the neutral particles in the gas sample to remain therein for determination of the neutral particle background.

12. The apparatus set forth in claim 1 wherein said gas sample expansion means comprises
a first valve connected at the input of said expansion chamber,
a second duct having an input end connected to the output of said expansion chamber,
a second valve connected in said second duct at an output of said expansion chamber, and
a third valve connected in said second duct adjacent an output end thereof, said pump means connected in said second duct downstream of said third valve, the second duct between said second and third valves forming a volume into which the gas sample in said expansion chamber is expanded.

13. The apparatus set forth in claim 12 wherein the second duct between said second and third valves is of elongated length for defining an appreciable volume.

14. The apparatus set forth in claim 12 wherein the second duct between said second and third valves is of foreshortened length but includes an enlarged portion for defining an appreciable volume.

15. The apparatus set forth in claim 8 wherein
a particular value of the alternating current voltage and frequency determines a particular range of charge-to-mass ratio of particles to be trapped in the three-dimensional quadrupole alternating current electrodynamic field, and
means for varying the voltage and, or, frequency of said alternating current power supply whereby a decrease in the voltage and, or, increase in the frequency results in a second particular range of charge-to-mass ratio of the charged particles being trapped and confined in the quadrupole field.

16. The apparatus set forth in claim 1 wherein
said droplet detecting means comprises
an intense light source for providing illumination of the droplets condensed on the confined particles,
photocell means for detecting the illuminated droplets, and
read-out means for establishing a count representing the relative number of particles detected by said photocell means.

17. The apparatus set forth in claim 16 wherein
said photocell means is oriented at 90° relative to said intense light source for detecting the light scattered off the droplets.

18. The apparatus set forth in claim 16 wherein
said intense light source and said photocell means are in alignment and disposed adjacent opposite sides of said expansion chamber for detecting the droplets by detecting the absorption of the light by the droplets.

19. The apparatus set forth in claim 3 wherein
said three electrodes consist of three coatings of an electrically conductive material attached on inner surfaces of top, bottom and side walls of said expansion chamber, a first of the three coatings attached along the top wall of said chamber, a second coating attached along the bottom wall of said chamber, and a third of said coatings attached along the side walls of said chamber to form a generally cylindrical coating, said first and second coatings spaced from said third coating to provide electrical insulation therebetween.

20. Apparatus for measuring the size distribution of particles including particulate matter in a gas sample comprising
means for saturating a gas sample containing various charged particles including particulate matter with a readily condensible vapor, said vapor saturating means having an input end open to the ambient containing the gas sample,
a first duct having an input end in communication with an output of said vapor saturating means,
a chamber having an input in communication with an output end of said first duct,
a second duct having an input end in communication with an output of said chamber,
pump means in communication with an output end of said second duct for developing a flow of the gas sample from said vapor saturating means through said first duct to said chamber and therefrom through said second duct,
means positioned within said chamber for generating a three-dimensional quadrupole alternating current electrodynamic field which traps charged particles in a particular range of charge-to-mass ratio as determined by the particular voltage and frequency of an alternating current power supply associated with said quadrupole field generating means whereby the charged particles in the particular range of charge-ro-mass ratio remain confined within the quadrupole field and the charged particles outside the particular range of charge-to-mass ratio are swept to sides of said chamber to thereby accomplish mass-selective sorting of the charged particles,
valve means connected in said first and second ducts for controlling the flow of the gas sample into and from said chamber, said chamber initially being evacuated to approximately 80 percent of the ambient pressure by said pump means and a first state of said valve means, the gas sample being introduced into said chamber in a second state of said valve means until the pressure within said chamber reaches substantially ambient pressure at which time said valve means is operated into a third state to cause expansion of the gas sample to thereby produce cooling and supersaturation thereof resulting in formation of droplets condensing on the particles in said chamber, and
means in optical communication with a selected region within said chamber containing the confined particles for detecting the relative number of the droplets therein which correspond to a like relative number of the charged particles in the particular range of charge-to-mass ratio occuring in the gas sample.

21. A method for measuring the size distribution of particles including particulate matter in a gas sample comprising the steps of
evacuating an expansion chamber to approximately 80 percent of the ambient pressure,
saturating a gas sample containing various particles including particulate matter with a readily condensible vapor,
electrically charging the condensible vapor saturated particles in the gas sample,
developing a flow of the gas sample including the electrically charged condensible vapor saturated particles through a first duct into the expansion chamber,
generating a three-dimensional multipolar alternating current electric field within the expansion chamber for trapping and confining within the field charged particles in a particular first range of charge-to-mass ratio and directing charged particles outside the particular range of charge-to-mass ratio to sides of the expansion chamber to thereby accomplish mass-selective sorting of the charged particles,
expanding the condensible vapor saturated gas sample in the expansion chamber to produce cooling and supersaturation thereof and thereby cause droplets to condense on the particles, and
detecting the relative number of the confined droplets in the expansion chamber which corresponds to a like relative number of the charged particles in the particular first range of charge-to-mass ratio occurring in the gas sample.

22. The method set forth in claim 21 wherein the step of generating the three-dimensional multipolar alternating current electric field consists of applying an alternating current voltage having a predetermined first amplitude and frequency to the centrally oriented of three electrodes positioned within the expansion chamber to thereby generate a three-dimensional quadrupole alternating current electrodynamic field which traps and confines charged particles in the first particular range of charge-to-mass ratio as determined by the particular voltage and frequency values of the alternating current voltage.

23. The method set forth in claim 22 and further comprising the steps of
repeating the steps of evacuating the expansion chamber to approximately 80 percent of the ambient pressure and saturating the gas sample with the readily condensible vapor and electrically charging the particles and developing the gas sample flow through the duct into the expansion chamber,
adjusting the alternating current voltage source to provide a second set of particular voltage and frequency values of the alternating current voltage corresponding to a particular second range of charge-to-mass ratio of particles to be trapped and confined in the quadrupole field,
applying the second set of values of alternating current voltage to the center electrode to thereby repeat the step of generating a three-dimensional quadrupole field within the expansion chamber for trapping and confining charged particles in the particular second range of charge-to-mass ratio,
repeating the steps of expanding the gas sample in the expansion chamber and detecting the relative number of confined droplets in the particular second range of charge-to-mass ratio to thereby determine the size distribution of the charged particles in the gas sample over two ranges of charge-to-mass ratio.

24. The method set forth in claim 21 wherein
the step of expanding the gas sample consists of closing a first valve at the entrance to the expansion chamber and opening a second valve at the exit of the chamber while maintaining a third valve located downstream of the second valve in a second duct in a closed position whereby the gas sample expands into the second duct between the second and third valves.

25. The method set forth in claim 21 and further comprising the steps of
removing the alternating current voltage applied to the center electrode,
applying a high direct current voltage to the center electrode in the order of several thousand volts to thereby generate a high strength constant direct current electric field which effectively sweeps out all of the charged particles and confines only neutral particles in the gas sample,
expanding the gas sample in the expansion chamber to thereby cause formation of droplets on the particles including the neutral particles confined in the volume defined by the electrodes, and
detecting the relative number of confined droplets which correspond to a like relative number of neutral particles in the gas sample to thereby determine the neutral particle background which is generally present in each of the particular ranges of charge-to-mass particle count measurements.

26. The method set forth in claim 21 wherein
the step of detecting the relative number of confined droplets in the expansion chamber consists of
directing a high intensity light into a particular region of the expansion chamber containing the confined droplets,
detecting the scattered light reflected by the confined droplets in the particular region of the expansion chamber, and
obtaining a count corresponding to the relative number of confined droplets detected in the particular region of the expansion chamber.

27. The method set forth in claim 21 wherein
the step of detecting the relative number of confined droplets in the expansion chamber consists of
directing a high intensity light into a particular region of the expansion chamber containing the confined droplets,
detecting the light absorbed by the confined droplets in the particular region of the expansion chamber, and
obtaining a count corresponding to the relative number of confined droplets detected in the particular region of the expansion chamber.

* * * * *